United States Patent
Law et al.

(10) Patent No.: US 6,639,899 B1
(45) Date of Patent: Oct. 28, 2003

(54) METHOD AND APPARATUS FOR PROVIDING INTEGRAL CELL PAYLOAD INTEGRITY VERIFICATION IN ATM TELECOMMUNICATION DEVICES

(75) Inventors: Randall Allan Law, Surrey (CA); Steven Douglas Margerm, Surrey (CA); Andre Poulin, Hull (CA); Robert Morton, Nepean (CA); Steve Driediger, Kanata (CA); Jason Sterne, Ottawa (CA); Pual Nadj, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/417,834

(22) Filed: Oct. 14, 1999

(51) Int. Cl.[7] .......................... G01R 31/08; G06F 11/00; H04K 1/00
(52) U.S. Cl. ..................... 370/242; 370/216; 370/395.6
(58) Field of Search ........................... 370/242, 395.31, 370/389, 253, 248, 244; 714/704, 818, 751, 752, 746, 701; 709/230

(56) References Cited

U.S. PATENT DOCUMENTS

| | | | | |
|---|---|---|---|---|
| 5,142,653 A | * | 8/1992 | Schefts | 370/253 |
| 5,313,453 A | * | 5/1994 | Uchida et al. | 370/248 |
| 5,491,697 A | * | 2/1996 | Tremel et al. | 714/704 |
| 5,513,191 A | * | 4/1996 | Takechi et al. | 714/752 |
| 5,742,765 A | * | 4/1998 | Wong et al. | 709/230 |
| 5,757,775 A | * | 5/1998 | Yokoyama et al. | 370/242 |
| 5,878,063 A | * | 3/1999 | Kawasaki et al. | 714/818 |
| 5,901,146 A | * | 5/1999 | Upp | 370/389 |
| 5,951,707 A | * | 9/1999 | Christensen et al. | 714/752 |
| 6,028,844 A | * | 2/2000 | Hao et al. | 370/242 |
| 6,363,078 B1 | * | 3/2002 | Garcia et al. | 370/438 |
| 6,381,245 B1 | * | 4/2002 | Hann et al. | 370/395.6 |
| 6,449,275 B1 | * | 9/2002 | Andersson et al. | 370/395.31 |

* cited by examiner

Primary Examiner—Wellington Chin
Assistant Examiner—Jamal A. Fox
(74) Attorney, Agent, or Firm—Oyen Wiggs Green & Mutala

(57) ABSTRACT

A method for verifying the integrity of data payloads of ATM cells passing through a switching device involves computing a payload integrity verification code for the payload portion of an ATM cell. The payload integrity verification code may be generated according to any error detection or error correction scheme. Preferably, the payload integrity verification code is stored in a portion of the standard ATM cell header which is not used while the cell is passing through the switching device. Preferably the payload integrity verification code is stored in all, or a portion of, the virtual path identifier or virtual connection identifier fields. The invention allows for the immediate identification of cells having corrupted payload data. Different actions may be taken on the detection of errors in the ATM cell header and ATM cell payloads respectively.

24 Claims, 9 Drawing Sheets

METHOD AND APPARATUS FOR PROVIDING INTEGRAL CELL PAYLOAD INTEGRITY VERIFICATION IN ATM TELECOMMUNICATION DEVICES

TECHNICAL FIELD

This invention relates generally to asynchronous transfer mode (ATM) networks. The invention relates more specifically to the detection of errors in ATM cell payloads within telecommunication devices. Various aspects of the invention provide methods for detecting errors in ATM cell payloads, an ATM switch adapted to detect errors in ATM cell payloads, and a signal useful in detecting errors in ATM cell payloads.

BACKGROUND

In an ATM network, data is forwarded in equal length cells. Each cell includes a header, which includes information specifying the destination of the cell, and a data payload. According to the current ATM specification, each ATM cell is 53 bytes long and consists of a 48-byte payload and a 5-byte header.

In an ATM network a number of virtual circuit connections (VCCs) are set up between pairs of end points on the network. Streams of ATM cells can be sent along each virtual circuit connection. In passing along a virtual circuit connection, each ATM cell typically passes through one or more ATM switches. The ATM switches direct the cells so that each cell will arrive at its intended end point. A challenge facing the designers of ATM networks is the very high speeds at which ATM cells must be passed through the network and switched by network switches. ATM cells can become corrupted as they pass through an ATM network for various reasons including hardware faults, hardware failures, and software errors which might, for example, cause certain components within an ATM switch to be improperly configured.

There are many systems for measuring the end-to-end performance of connections provided by an ATM network. Such systems typically measure the performance of end-to-end channels across an ATM network. While there are methods for determining the node in an ATM network at which faults are occurring, such methods do not facilitate the location of specific faulty cards or modules of telecommunication devices on the ATM network. In studying the source of errors in ATM networks it is often assumed that errors arise in the communication links connecting switches in the network and that network switches perfectly transmit all ATM cells which they receive. It is inevitable, however, that some ATM cells will become corrupted as they pass through ATM switches. Since ATM cells pass through many switches in traversing most practical ATM networks, the localization of intermittent errors to particular switches or to particular portions of switches can be very difficult with prior methods.

Most standards governing the manner in which ATM cells are passed over the physical links which connect telecommunication devices in ATM networks include error detection protocols. There are no such standards for detecting ATM cells which become corrupted within telecommunication devices.

There is a need for an effective way to detect and localize errors which result in the corruption of data payloads in ATM cells. In particular, there is a need for effective methods and apparatus capable of identifying specific cards or modules within ATM telecommunication devices at which ATM cells are being corrupted. There is a particular need for such methods and apparatus which fully cover data paths within ATM telecommunication devices and do not merely cover specific interfaces between devices or functions internal to a telecommunication device, such as a switch. Such data paths may include several buffers, interfaces, connections etc. as they pass through a telecommunication device.

SUMMARY OF INVENTION

This invention provides methods and apparatus for verifying the integrity of the data payloads of ATM cells within ATM telecommunication devices, such as ATM switches. The methods of the invention involve generating a payload integrity verification code for ATM cells entering a telecommunication device. The payload integrity verification code is attached to the cell. At one or more downstream locations within the telecommunications device the payload integrity verification code is checked to determine whether it matches the cell data payload. This may be done by recalculating the payload integrity verification code and comparing it to the originally calculated payload integrity verification code. Preferably the payload integrity verification code is checked at multiple downstream locations to permit the identification of defective modules within the telecommunication device.

In some embodiments of the invention the payload integrity verification code is written to the VPI/VCI fields of the cell (i.e. one or more of the 5th through 28th bits of the 5 byte ATM cell header). While an ATM cell is in transit through a telecommunication device the VPI field, the VCI field, or both the VPI AND VCI fields are often irrelevant. Therefore one can surprisingly provide cell payload integrity verification by including a payload integrity verification code in VPI field and/or the VCI field without adversely affecting throughput of the telecommunication device. The payload integrity verification code may be a checksum, a CRC-8 value, a CRC-4 value, a parity bit, a BIP code or another suitable error correction or error detection code. In other embodiments of the invention the payload integrity verification code is included in an additional header or trailer attached to an ATM cell.

Accordingly, one aspect of the invention provides a method for verifying the integrity of an ATM cell payload within an ATM telecommunication device. The method comprises: generating a first payload integrity verification code for the payload of an ATM cell at an upstream location within an ATM telecommunication device; attaching the first payload integrity verification code to the cell; reading the cell payload and the first payload integrity verification code from the cell at a downstream location and checking to see whether the cell payload matches the first payload integrity verification code as read from the cell. In some embodiments checking to see whether the cell payload matches the first payload integrity verification code comprises generating a second payload integrity verification code from the cell payload at a downstream location within the telecommunication device; comparing the second payload integrity verification code to the first payload integrity verification code attached to the cell; and, if the first and second payload integrity verification codes are not identical signalling an error condition.

Another aspect of the invention provides an ATM telecommunication device for use in an ATM packet switching network. The ATM telecommunication device comprises: an ingress, an egress, and a data path extending between the ingress and the egress; a payload integrity verification code calculator at a first location on the data path; a payload integrity verification code writing circuit connected to write a first payload integrity verification code to an ATM cell at the first location; and a payload integrity verification circuit at a second location on the data path downstream from the first location. In a preferred embodiment the payload integrity verification circuit comprises a second payload integrity verification code generator located on the data path downstream from the first location; and, a comparing circuit connected to compare the first payload integrity verification code generated by the first payload integrity verification code calculator to a second payload integrity verification code detection generated by the second payload integrity verification code calculator and a signalling circuit to generate an error signal whenever the first payload integrity verification code is different from the second payload integrity verification code.

Yet another aspect of the invention provides a signal propagating in an ATM switch. The signal comprises an ATM cell payload, an ATM cell header, and an payload integrity verification code for the ATM cell payload, the payload integrity verification code stored in VCI and/or VPI fields of the ATM header.

A further aspect of the invention comprises a method for passing information from an upstream location in a cell stream in an ATM telecommunication device to a downstream location in the ATM telecommunication device. The method avoids increasing the amount of data to be sent through the telecommunication device by reusing at least a portion of one or more of the VPI and VCI fields of ATM cells. The method comprises: receiving at an ATM telecommunication device an ATM cell having VPI and VCI fields in an ATM cell header; at an upstream location within the ATM telecommunication device, adding a connection identifier to the ATM cell and recording information in at least a portion of the VPI and VCI fields of the ATM cell; passing the cell to a downstream location along a data path in the ATM telecommunication device; at the downstream location retrieving the recorded information; and, before the cell egresses from the ATM telecommunication device, if the information is recorded in any portion of the VPI field, writing a VPI value to the VPI field of the cell and, if the information is recorded in any portion of the VCI field, writing a VCI value to the VCI field of the cell and removing the connection identifier. The telecommunication device may be an ATM switch for example.

Further aspects and advantages of the invention are described below.

BRIEF DESCRIPTION OF DRAWINGS

In drawings which illustrate non-limiting embodiments of the invention.

DESCRIPTION

Figure 1:
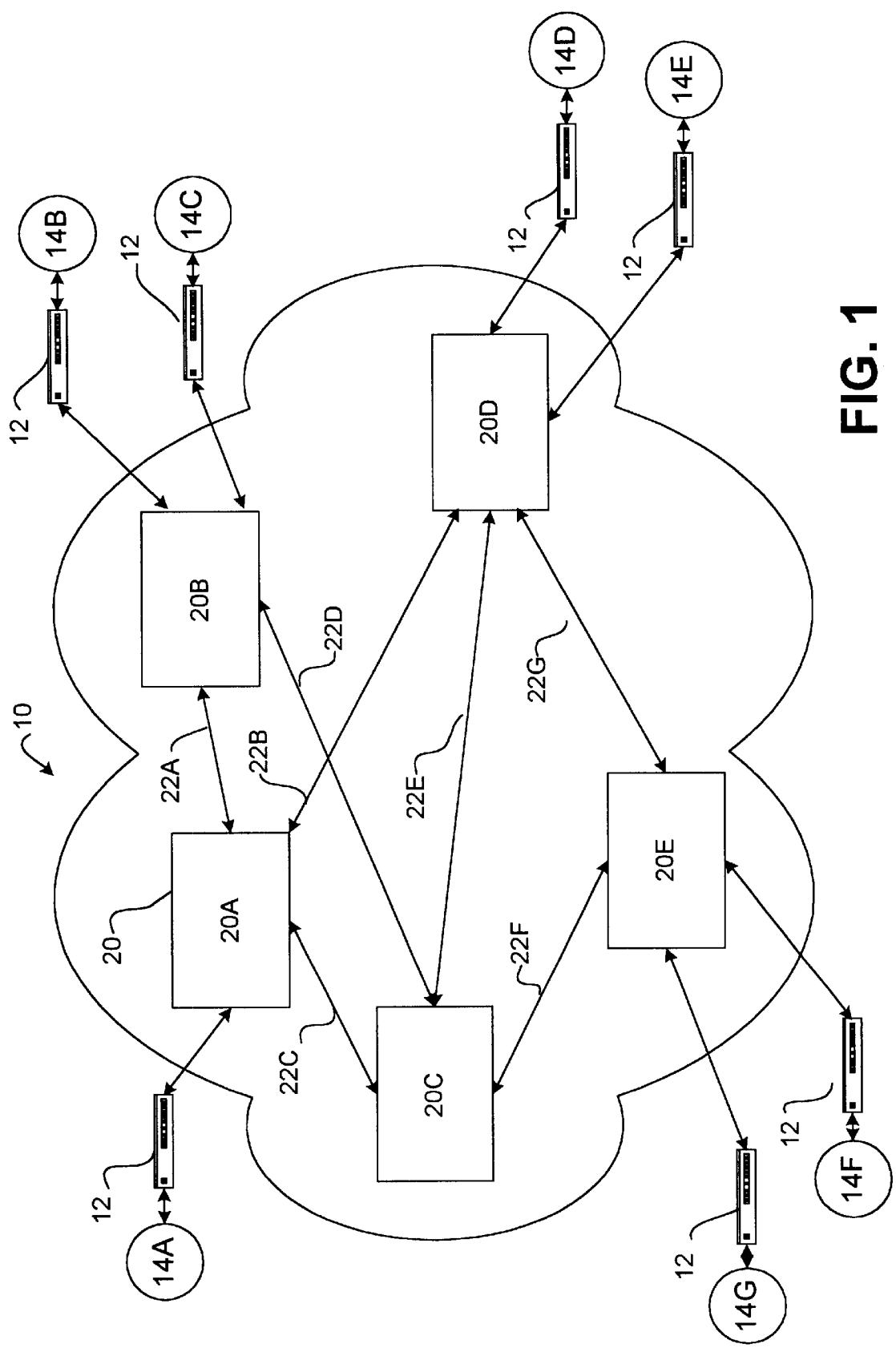
FIG. 1 is a schematic illustration of a simple prior art ATM network.

FIG. 1 illustrates a simple ATM network 10. Network 10 permits data to be interchanged between a number of network edge devices 12. Each network edge device 12 provides an end point. The simple network of FIG. 1 permits data to be interchanged between 7 end points 14A through 14G.

Network 10 comprises 5 ATM switches 20A–20E (collectively, 201) linked by communication links 22A–22G (collectively, 22). Communication links 22 typically comprise fiber-optic cables, but may also comprise wired or wireless connections. Communication links 22 may carry ATM cells by any of a variety of physical layer protocols.

Figure 2:
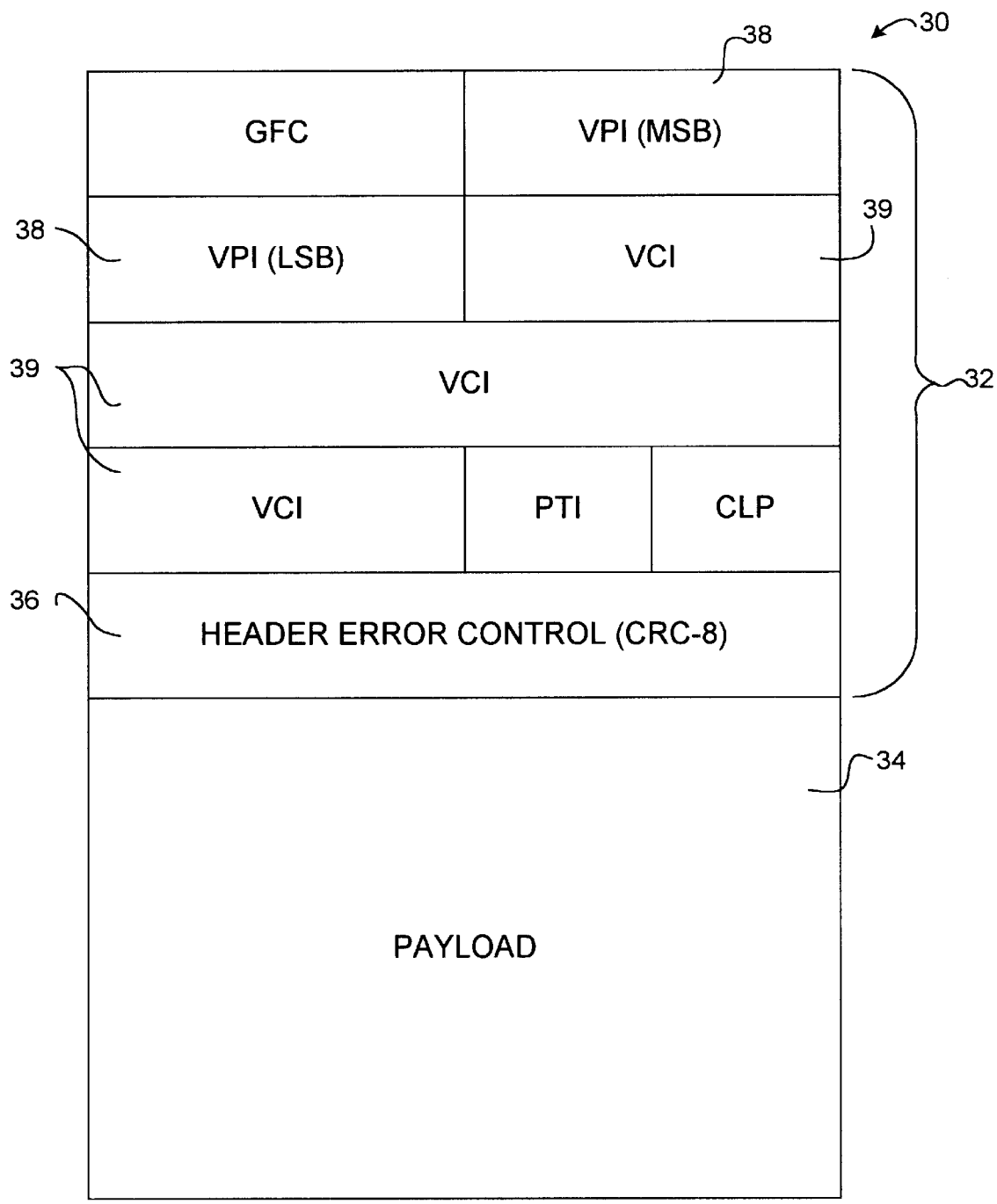
FIG. 2 is a view illustrating a structure of an ATM cell.

FIG. 2 shows the structure of a cell 30 according to the current ATM standard. Cell 30 comprises a 5-byte header 32 and a 48-byte payload 34. Cell 30 has a total of 53 bytes. Header 32 has a number of fields including a virtual path identifier ("VPI") field 38, a virtual channel identifier ("VCI") field 39 and a header error control value 36. In some portions of an ATM network a portion of VPI field 38 may be allocated for generic flow control ("GFC"). In this specification the term "VPI field" includes any portion of the VPI field which may be allocated to GFC. As is known in the art and shown in FIG. 2, header 32 may also comprise memory allocated to a payload type indicator ("PTI") field and memory allocated to a cell loss priority ("CPL") field.

Any link 22 in network 10 will typically be carrying ATM cells 30 for a number of different VCCs at any given time. As the destination of each cell is specified by the combination of the cell's virtual path and virtual channel identifiers (VPI/VCI) it is necessary to operate network 10 in such a manner that there is never a case where cells belonging to different VCCs traversing a single link 22 have the same VPI/VCI value. Because VCCs are being set up and taken down on a continuous basis, it is generally impractical to assign VPI/VCI values to each VCC in a manner which ensures that the above-noted situation will never arise. Consequently, ATM networks assign values of VPI and VCI for each link 22.

Figure 3:
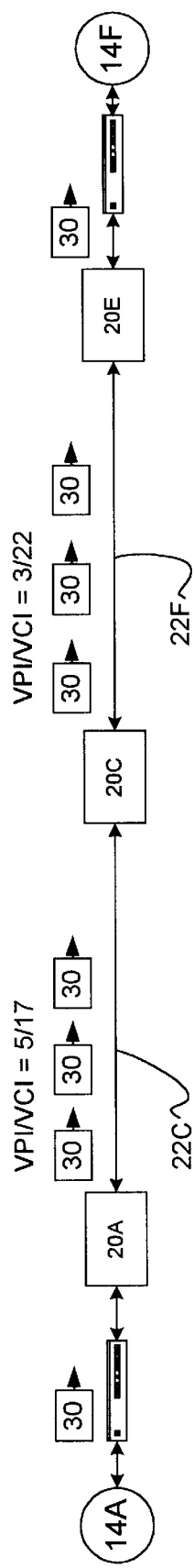
FIG. 3 is a schematic view illustrating a possible virtual circuit connection provided by the network of FIG. 1.

FIG. 3 shows an example of a possible VCC connecting end points 14A and 14F. Cells in the VCC are delivered to switch 20A and then travel to switch 20C via link 22C. The cells then travel through switch 20E on link 22F. Finally the cells are delivered by switch 20E to end point 14F. In the given example, cells are assigned the VPI/VCI 5/17 for the time they are traversing link 22C and are assigned the VPI/VCI 3/22 for the time they are traversing link 22F. These values are chosen at the time the VCC is set up so as not to conflict with the VPI/VCI values for any other VCC traversing links 22C or 22F respectively.

At switch 20A, each packet in this VCC is assigned the VPI/VCI 5/17. These values are written to the VPI and VCI fields in the cell header 32 for each cell travelling in the VCC. In switch 20C the VPI/VCI pair 5/17 is read and switch 20C determines that the appropriate VPI/VCI for link 22F is 3/22. Switch 20C therefore writes VPI equal to 3 in the VPI field 38 of cell 30, writes VCI equal to 22 in the VCI field 39 of cell 30 and forwards cell 30 out the port connected to link 22F for delivery to switch 20E.

Cells 30 may become unintentionally lost in transit between endpoints 14A and 14F. Switches 20A, 20C and 20E operate at very high speeds. It is possible that the header of any cell 30 may become corrupted in passing through a switch. A header may become corrupted due to faulty hardware, transient events such as the interaction of gamma rays with memory devices inside a switch, power fluctuations or the like. It is difficult to determine where such unintentional cell losses occur. Cells 30 could be lost in one of communication links 22C or 22F, or one of switches 20A, 20C or 20E, or one of network edge devices 12, or in the communication links 22 connecting edge devices 12 with switches 20A and 20E respectively.

Figure 4:
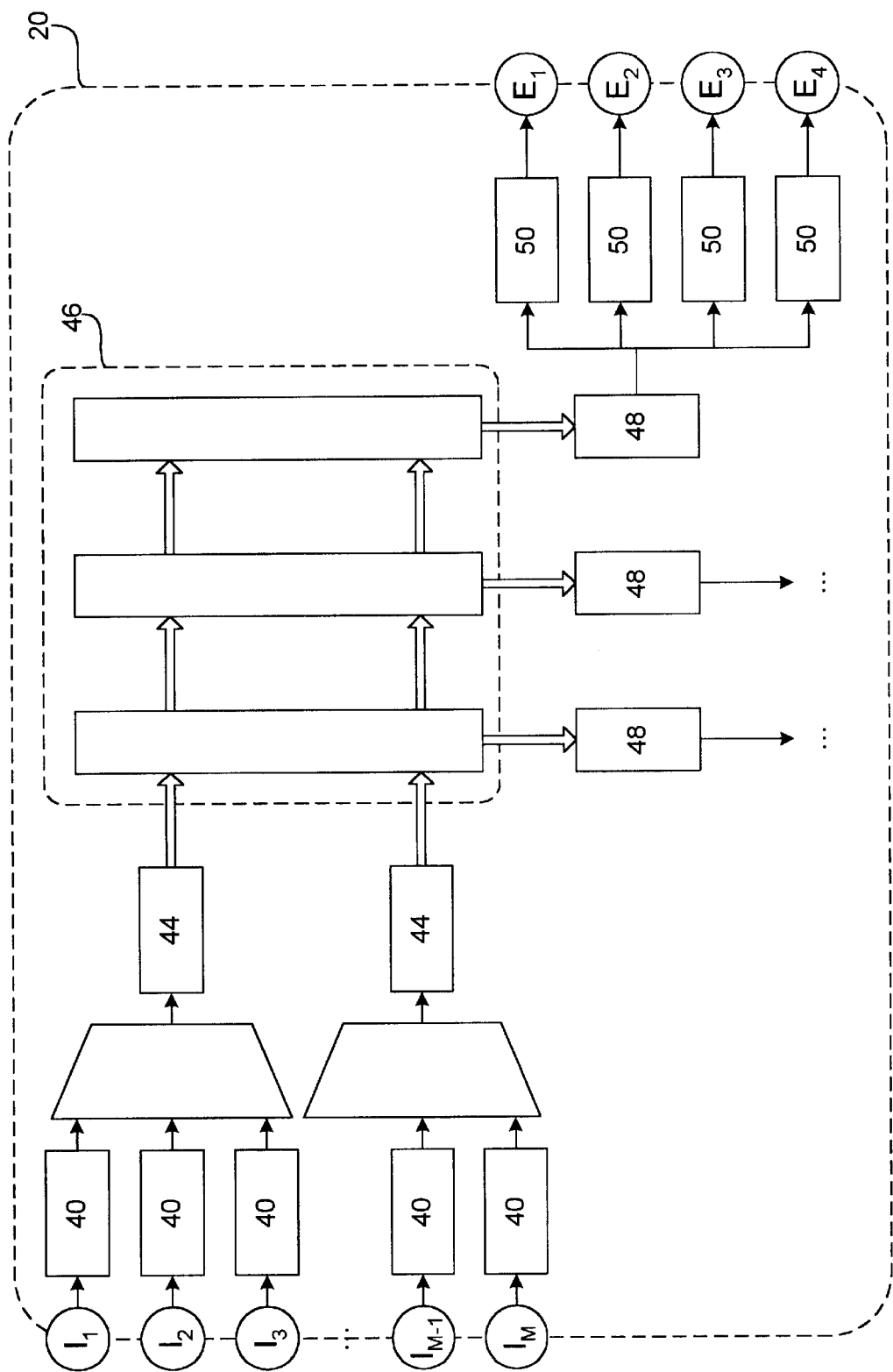
FIG. 4 is a block diagram of some main functional components of an ATM switch.

FIG. 4 illustrates a typical ATM switch 20. Switch 20 has a number of ingress ports $I_1$–$I_M$ (collectively, I) and a number of egress ports $E_1$–$E_4$ (collectively, E). Cells are received at ingress points I and delivered to ingress cards 40. Cells from several ingress cards 40 may be passed to a multiplexer 42 and to a hub 44. Hub 44 passes the cells into a switching matrix 46. Switching matrix 46 selectively directs the cells to one of several hubs 48. From hubs 48 the cells are directed to egress cards 50 which are each connected at one of egress ports E to an outgoing link 22 (see FIG. 1).

Typically, at ingress cards 40 the VPI/VCI information for each cell is read and converted to a connection identifier which is used internally in switch 20. The connection identifier identifies the egress port E to which the cell should be directed and also specifies the VCC to which the cell in question belongs. At egress cards 50 and/or egress ports E, the connection identification is used to determine the VPI/VCI to be used for the cell on the next communication link 22 (see FIG. 1). The connection information is typically included as part of an additional proprietary header which is added to the cell at an ingress card 40. In order to maximize throughput of switch 20 it is generally desirable to keep the size of the proprietary header to a minimum.

While it is not illustrated here, an ATM switch such as the one shown in FIG. 4 typically includes parallel redundant fabric, such that if there is a failure in one part of this fabric, the switch can continue to operate. Furthermore, the switch typically includes a number of separate circuit boards which can be individually removed and replaced to correct any problems which may develop. Data corruption may occur at any point within switch 20.

Figure 5:
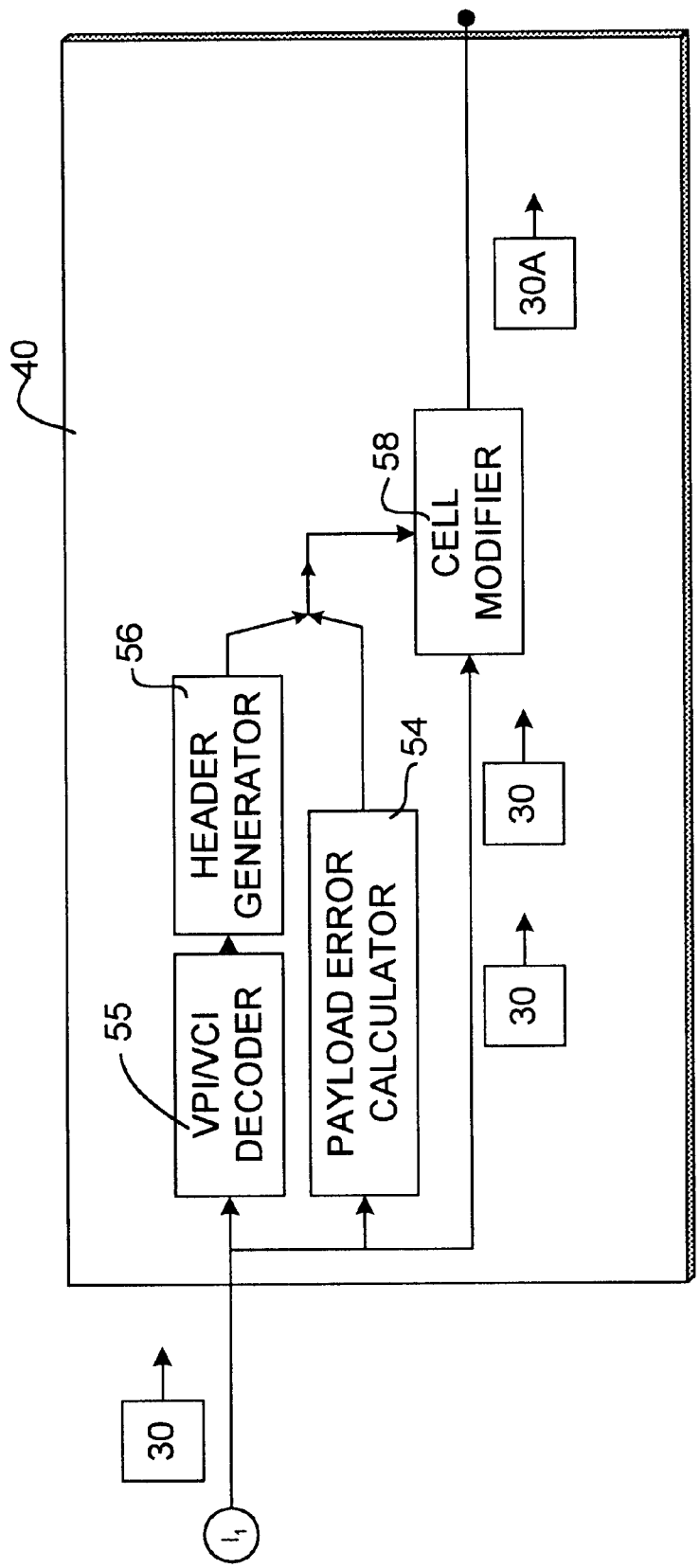
FIG. 5 is a block diagram illustrating an ingress card in an ATM switch according to the invention.

This invention detects corruption of payloads 34 which occur inside an ATM telecommunication device, such as a switch, by computing an payload integrity verification code for the payload of each cell. The payload integrity verification code is computed and attached to the cell as closely as possible to the point of ingress of the cell 30 to the telecommunication device. FIG. 5 shows an example of an ingress card 40 which includes apparatus for practicing the invention. Ingress card 40 includes a payload integrity verification code computation circuit 54 which computes a payload integrity verification code for each cell 30 received at ingress $I_1$. Depending upon the number of bits available for carrying the payload integrity verification code the payload integrity verification code may be for example a CRC-8 value, a CRC-4 value, a parity bit or another suitable error detection code. The payload integrity verification code is associated with a cell 30 by cell modifier 58 and is forwarded with cell 30 through the switch 20. Cells modified by cell modifier 58 are labelled 30A.

In a preferred embodiment of this invention, ingress card 40 includes a VPI/VCI decoder 55 which reads the VPI/VCI value for each cell and identifies a cell stream to which each cell belongs. VPI/VCI decoder 55 identifies a connection identifier ("CI") for the cell. The connection identifier is typically included in an additional header which is generated by a header generator 56. The additional header generated by header generator 56 is added to the cell 30 at cell modifier 58. While it is not conventional to do so, the CI could also be included in a trailer added to each ATM cell. Methods and apparatus suitable for identifying cell streams and generating additional cell headers or trailers are well understood to those skilled in the art and will therefore not be described herein.

The payload integrity verification code generated by payload error calculator 54 is preferably written to all, or a portion of, the VPI/VCI fields 38, 39 for the cell. As noted above, the VPI and/or VCI fields are not required within switch 20, because the destination of the cell is specified by the connection identifier generated by header generator 56 and added to cell 30 by cell modifier 58. On egress from switch 20 the VPI and/or VCI values for any cell will be set to new, probably different, values which will apply for the next hop to be taken by the cell 30 on the next link 22 (See FIG. 1). By reusing one or both of the VPI/VCI fields, or portions of one or both of those fields, for payload integrity verification code information while the cell is passing through a switch 20, one arrives at the useful and surprising result that one can add a payload integrity verification code to cells 30 passing through switches 20 to enable the detection of payload corruption within the switch 20 without increasing the size of the cells 30A traversing the switch 20.

In some types of ATM switching the VCI field is not rewritten at the egress of the switch but the VPI field is rewritten. In such cases the payload integrity verification code information may be included in all, or a portion of the VPI field of ATM cells.

If the payload integrity verification code is written into the VPI and/or VCI fields of cells then preferably a flag in an additional header or trailer of the cell is set to indicate that the VPI and/or VCI fields contain the payload integrity verification code. In some cases the methods of the invention will not be applied to all cell streams in a telecommunication device. In such cases the flag is needed, so that downstream error checkers do not attempt to interpret (as payload integrity verification codes) the VPI and/or VCI values in those cells belonging to streams which do not have payload integrity verification codes written to their VPI/VCI fields.

The payload integrity verification code computed by payload integrity verification code calculator 54 may also be included as part of the proprietary header (or trailer) which is added to the cell 30 by cell modifier 58. While this embodiment of the invention does provide for the detection of payload corruption as a cell passes through a switch 20 (see FIG. 1) or other telecommunication device, it is not ideal. Adding cell payload integrity verification codes to the additional header increases the size of the additional header. This will negatively impact the throughput of switch 20, unless the data paths within switch 20 have been designed to have capacity sufficient to handle ATM cells with the additional header at the switch's maximum available throughput.

Figure 6:
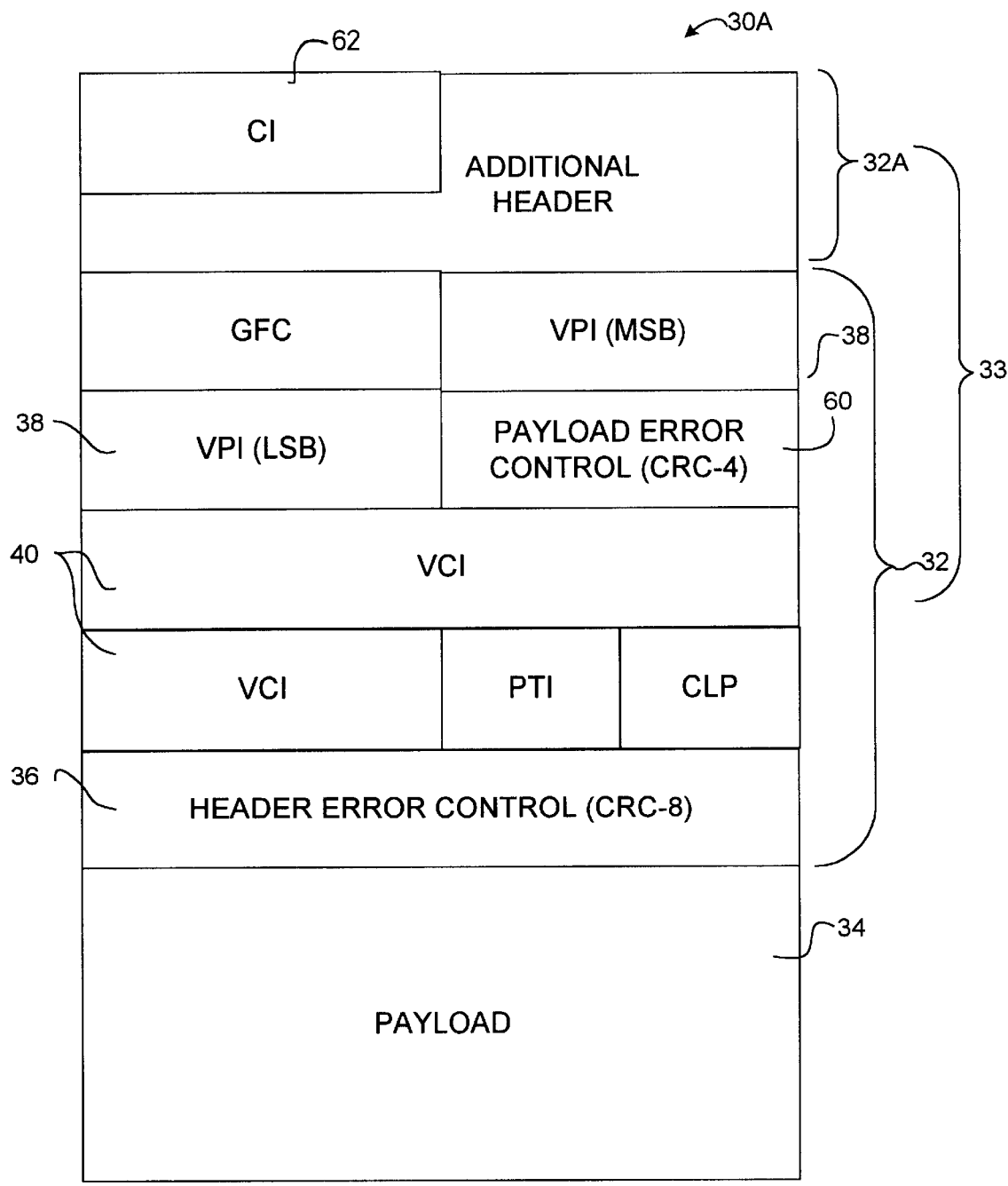
FIG. 6 is a signal according to the invention being propagated through an ATM switch.

FIG. 6 shows an example of the format of a signal 30A representing a cell 30 traversing a switch 20. Signal 30A may be, at various times, embodied as a data structure within a memory in switch 20, as electrical signals on a bus within switch 20, or as optical signals on an optical bus within switch 20.

Signal 30A has a payload 34, and a header 33. Header 33 comprises a header 32, as described above, which typically includes fields allocated to generic flow control ("GFC"), payload type indicator ("PTI"), cell loss priority ("CLP"), virtual path identifier ("VPI"), and virtual channel identifier ("VCI"). As described above, header 33 has been modified for travel through switch 20 by including a payload integrity verification code 60 in all, or part of VPI field 38 and/or VCI field 39. In the example of FIG. 6, payload integrity verification code 60 comprises a CRC-4 checksum and occupies the highest order 4 bits of the VCI field 39 (compare FIGS. 2 and 6). Header 33 also comprises an additional header 32A, which includes at least a connection identifier ("CI") field 62. Preferably, a portion of header 33 is allocated for a header error control value 36 which may comprise a CRC-8 checksum, or other header error control value. Header error control value 36 is preferably computed for all of header 33, and not merely header 32. It is important to detect errors in header 33, because an error in header 33 could result in a cell being delivered to an unintended destination.

Figure 7:
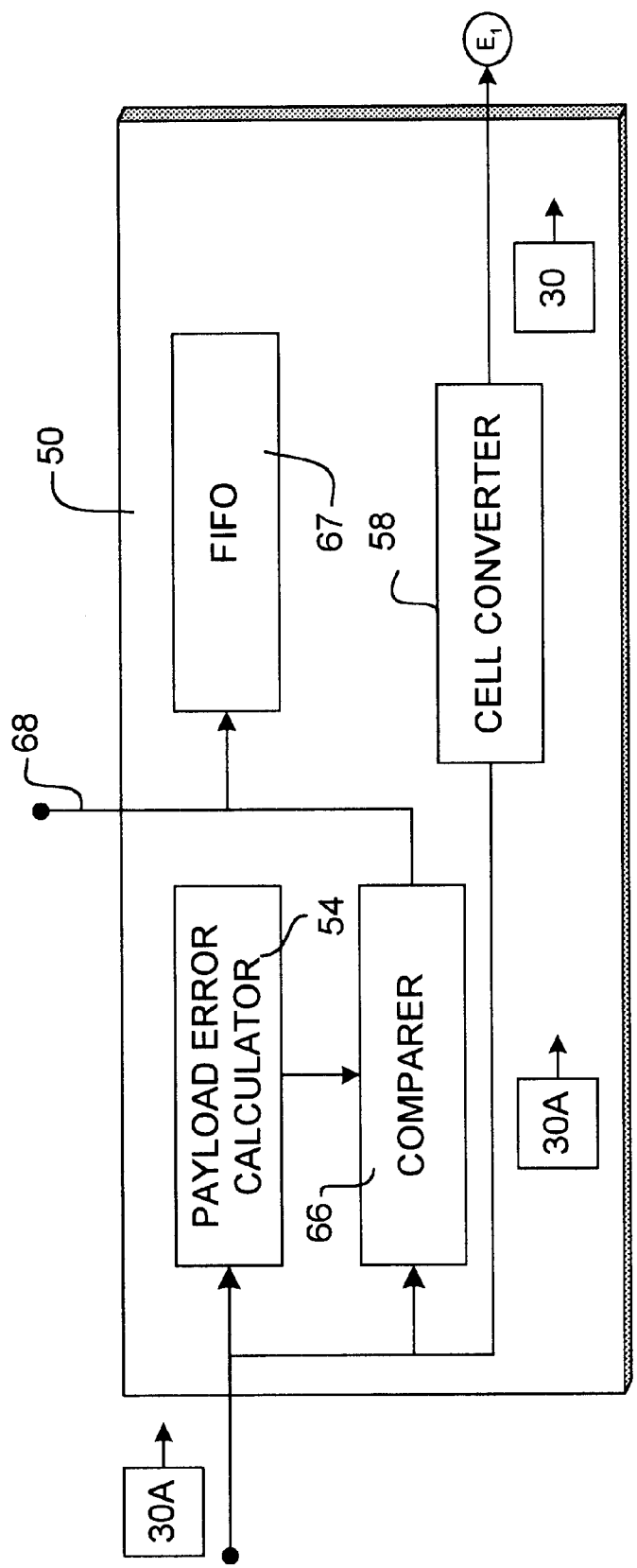
FIG. 7 is a block diagram illustrating selected functional components of an egress card in an ATM switch according to the invention.

As shown in FIG. 7, egress card 50 includes a payload integrity verification circuit. In the embodiment of FIG. 7 the payload integrity verification circuit comprises a second payload integrity verification code calculator 54 and a comparison circuit 66. Second payload integrity verification code calculator 54 computes, again, the error code for the payload 34 of a cell 30A arriving at egress board 50 and then comparison circuit 66 compares the result of that calculation with the payload integrity verification code 60 written in cell 30A. If the results match then it is assumed that the payload of the cell has not been corrupted during passage through the switch and the cell is then passed out of egress board 50 to egress $E_1$ by way of a cell converter 68. Cell converter 68 strips off additional header 32A and writes appropriate VPI/VCI values to fields 38 and 39 for the next link in the cell's VCC.

If the second payload integrity verification code generated by second payload integrity verification code calculator 54 does not match the payload integrity verification code 60 stored in the header 33 of the cell (see FIG. 6), then it is known that the payload of the cell must have been corrupted somewhere within switch 20. In the case of a mismatch an error is signaled. In the example of FIG. 7, an error is signaled by writing the connection identifier for the cell in question to a first in first out (FIFO) memory 67. Other action could be taken, for example, any cell with a corrupted payload could be dropped or an error signal could be delivered on an error signal line 69.

The payload integrity verification circuit may comprise, in the alternative, a calculator which computes a result as a function of a payload integrity verification code and a cell payload. The result has a first value if the payload integrity verification code matches the cell payload. The result has a value other than the first value if the payload integrity verification code does not match the cell payload. The result may be inspected to determine whether or not it has the first value. If the result does not have the first values then an alarm signal may be generated. The particular function used to compute the result will depend upon the function used to compute the payload integrity verification code. For example, if the payload integrity verification code is a parity bit, then the result may be computed by computing the parity of the cell payload taken together with the payload integrity verification code.

In order to detect as many instances as possible of payload corruptions which occur inside a switch 20, it is desirable t hat the payload integrity verification code 60 for each cell be calculated as close as possible to the ingress at which the cell enters switch 20. The second calculation of the payload integrity verification code 60 should occur a s closely as possible to the egress at which the cell leaves the switch 20.

To locate more precisely where inside a switch the payload of a cell has become corrupted it is desirable to provide one or more additional payload integrity verification circuits (in the illustrated embodiment, such verification circuits comprise code calculators 54 and comparers 66) at various points within switch 20. A payload integrity verification circuit may be provided at the egress and ingress of each card, or other replaceable module, in a data path in an ATM switch or other telecommunications device. This would enable the reasonably rapid identification of a specific card or module on which data corruption errors are occurring. This in turn enables a technician to replace the card or module to restore normal service. Each payload integrity verification circuit (i.e. code calculator and 54 and comparer 66) function as described above to determine whether the cell's payload may be corrupted. If a mismatch is detected then the circuitry can signal an error condition as described above.

Where a cell may pass through two or more payload integrity verification circuits on its way through a switch 20, it is generally desirable that the first payload integrity verification circuit encountered by the cell somehow alters the cell, if an error is detected. The alteration to the cell indicates to any downstream payload integrity verification circuits that an error in the cell has already been detected. This may be done in a number of ways. For example, a at each payload integrity verification circuit which detects an error, the payload integrity verification code 60 (see FIG. 6), and, if necessary the header error control value 36, can be recalculated for cells identified as having corrupted payloads. The recalculated value(s) can be written to appropriate locations in the cell. Unless the cell becomes further corrupted as it passes downstream through switch 20, downstream payload integrity verification circuits will read the recalculated payload integrity verification code 60 and will not detect that the cell has been corrupted.

In the alternative, a particular payload integrity verification code 60 may be reserved for use with cells having previously detected errors. Downstream payload integrity verification circuits may be configured to ignore cells having the reserved payload integrity verification code. This has the disadvantage that a certain number of payload errors may pass undetected, but has the advantage that it does not require any extra space to be reserved in cell 30 for a flag, or the like, which could further reduce the throughput of switch 20.

Figure 8A:
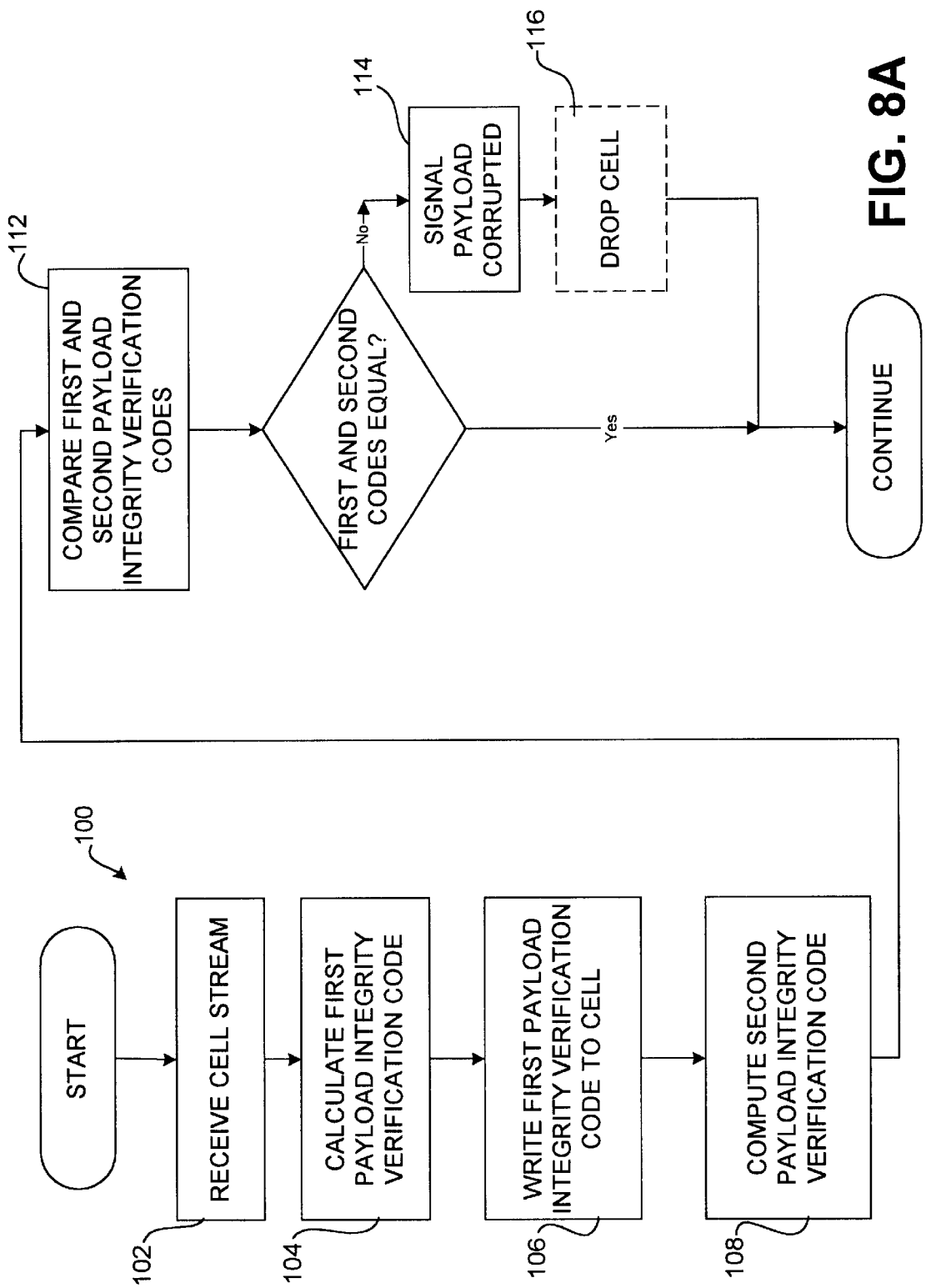
FIG. 8A is a flowchart illustrating a method according to the invention.

FIG. 8A shows a method 100 according to a simple embodiment of the invention. Method 100 begins by receiving a cell 30 at a switch 20 (Step 102). In Step 104 a first payload integrity verification code 60 is calculated. In Step 106 the payload integrity verification code 60 is added to the cell 30. At a second point, while cell 30 is still within the switch 20, a second payload integrity verification code is generated (Step 108). The first and second payload integrity verification codes are then compared in Step 112. If the first and second payload integrity verification codes are the same, then no problems have been detected with the payload of the cell and the cell is sent onwardly. If the first and second payload integrity verification code 60 are not the same, then an error is signaled (Step 114). Optionally the cell may be dropped (Step 116) or other corrective action may be taken.

Where there is a payload integrity verification circuit which is upstream from another payload integrity verification circuit (i.e. where there are two or more downstream payload integrity verification circuits), it may be desirable for the upstream payload integrity verification circuit to alter the payload data, so that additional error signals are not generated by all of the downstream payload integrity verification circuits. This may be done, for example, by re-calculating the payload integrity verification code for each cell in which an error is detected at the upstream payload integrity verification circuit, writing the re-calculated value of the payload integrity verification code to the cell, and then forwarding the cell along the data path. Unless the payload data becomes further corrupted, subsequent payload integrity verification circuits will not detect an error in respect of that cell.

Figure 8B:
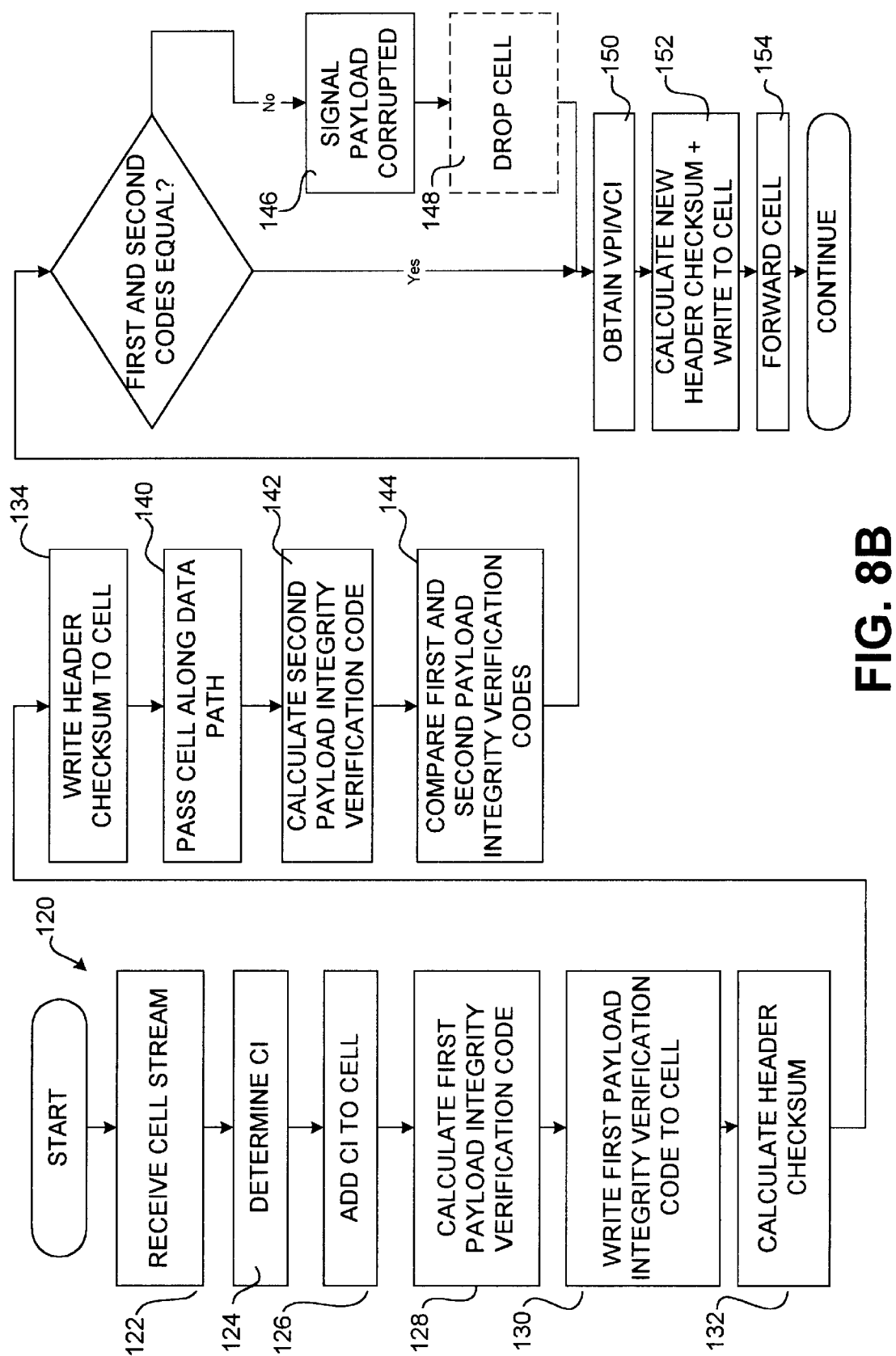
FIG. 8B is a flowchart illustrating a method according to a specific embodiment of the invention.

FIG. 8B shows a method 120 according to a more specific embodiment of the invention. Method 120 begins by receiving a cell 30 at a switch 20 (Step 122). The VPI and/or VCI fields of the cell are read and a connection identifier 62 is generated for the cell (Step 124). The connection identifier 62 is added to the cell (Step 126). Step 126 may involve, for example, adding an additional header 32A to the cell (see FIG. 6. In Step 128 a payload integrity verification code 60 is generated. Step 128 may be performed in parallel with, before, or after Steps 124 and 126. Payload integrity verification code 60 is then written to all, or a portion of the VPI/VCI fields 38 39 (see FIG. 6 in the header 32 of the cell 30 (step 130). Subsequently, a header error control value 36 is computed for the header 33 of the cell in Step 132. Step 132 may be performed at any time after the content of the various fields in the header 33 of the cell are known. It is not necessary for step 132 to be delayed until after Step 130. Preferably header error control value 36 is calculated from both header 32 (as modified by the replacement of part or all of the VPI/VCI fields 38, 39 with payload integrity verification code 60 (see FIG. 6) and any additional headers 32A. In Step 134 header error control value 36 is written to the header error control field (see FIG. 6). The cell 30 passes through switch 20 along a data path determined primarily by the connection identifier (Step 140).

Before cell 30 leaves switch 20, the payload integrity verification code for the cell payload 34 is computed again (Step 142) to yield a second payload integrity verification code 60. The first and second payload integrity verification codes 60 are then compared (Step 144). If the result of the comparison is that the first and second payload integrity verification codes are the same, then the packet continues to the egress of switch 20. If the result of the comparison is that the first and second payload integrity verification code 60 are not the same, then an error is signaled (step 146). Optionally, corrective action, such as dropping the cell, is taken (Step 148). If the cell is not dropped, then the corrupted cell may be allowed to proceed to the egress of the switch 20.

At the egress of switch 20, a VPI/VCI for the next link 22 is obtained (Step 150). The VPI/VCI is written to the VPI/VCI fields 38, 39 in header 32 and the additional header 32A is stripped from the cell. The header error control value 36 is re-calculated and written to the header error control field (step 152). This cell is then forwarded to the next switch (or to a network edge device 12) on the next communication link 22 (step 154).

Only hardware which is explicitly involved in the practice of this invention is shown in the drawings and described above. Other hardware which is implicitly involved in the practice of the invention or not involved is not illustrated for clarity. Such hardware is well understood to those skilled in the art of designing ATM telecommunication devices. Because modern ATM switches operate at such high data rates, it is typically not possible to process ATM cells under software control. Instead, the logic for processing ATM cells is typically provided either in application specific integrated circuits (ASICs) or in field programmable gate arrays (FPGAs). Apparatus for practising this invention may be incorporated in such ASICs of FPGAs. It can be appreciated that one advantage of this invention is that it can be practised without the need to add or replace the hardware used in many ATM telecommunications devices. Such devices are often sufficiently flexible in design that they may be configured to practice this invention.

As will be apparent to those skilled in the art in the light of the foregoing disclosure, many alterations and modifications are possible in the practice of this invention without departing from the spirit or scope thereof. For example, while the foregoing text uses the term "header" to describe how additional information is associated with a cell, it is not necessary that the additional "header" be in any specific location relative to other data for a cell. Instead of a header a trailer could be used to carry additional information associated with a cell in a telecommunication device. Accordingly, the scope of the invention is to be construed in accordance with the substance defined by the following claims.

What is claimed is:

1. A method for verifying the integrity of an ATM cell payload within an ATM telecommunication device the method comprising:

(a) at an upstream location within an ATM telecommunication device generating a first payload integrity verification code for the payload of an ATM cell;

(b) attaching the first payload integrity verification code to the cell;

(c) at a downstream location within the telecommunication device reading the payload of the ATM cell and reading the first payload integrity verification code from the ATM cell and checking to determine whether the first payload integrity verification code matches the payload of the ATM cell; and, (d) if the first payload integrity verification code does not match the payload of the ATM cell, signalling an error condition.

2. The method of claim 1 wherein checking to determine whether the first payload integrity verification code matches the payload of the ATM cell comprises generating a second payload integrity verification code from the cell payload and, comparing the second payload integrity verification code to the first payload integrity verification code attached to the cell.

3. The method of claim 2 wherein the first payload integrity verification code is generated at an ingress to the telecommunication device and the second payload integrity verification code is generated at an egress from the telecommunication device.

4. The method of claim 2 comprising generating a third payload integrity verification code from the cell payload while the cell is within the telecommunication device between the upstream and downstream locations; comparing the third payload integrity verification code to the first payload integrity verification code; and, if the first payload integrity verification code is not identical to the third payload integrity verification code signalling an error condition.

5. The method of claim 4 further comprising writing the third payload integrity verification code to the cell whenever the first payload integrity verification code is not identical to the third payload integrity verification code.

6. The method of claim 5 wherein, if the results of the comparison between the first and third payload integrity verification code is that the first and third payload integrity verification codes are not identical, writing a value to the cell in place of the first payload integrity verification code to indicate that an error has been detected in the cell payload.

7. The method of claim 1 wherein checking to determine whether the first payload integrity verification code matches the payload of the ATM cell comprises obtaining a result by computing a function of the cell payload and the first payload integrity verification code and comparing the result to a correct value.

8. The method of claim 1 wherein attaching the first payload integrity verification code to the cell comprises storing the payload integrity verification code in part or all of the VPI/VCI field for the cell.

9. The method of claim 8 comprising attaching to each cell an additional header comprising a connection information field derived from values of VPI and VCI fields of the cell.

10. The method of claim 1 wherein attaching the first payload integrity verification code to the cell comprises including the first payload integrity verification code in an additional header attached to the cell.

11. The method of claim 1 wherein attaching the first payload integrity verification code to the cell comprises including the first payload integrity verification code in a trailer attached to the cell.

12. The method of claim 1 wherein the first payload integrity verification code is a CRC-4 code.

13. The method of claim 1 wherein the payload integrity verification code is a CRC-8 code.

14. The method of claim 1 wherein the first payload integrity verification code is a parity bit.

15. The method of claim 1 comprising checking to determine whether the first payload integrity verification code matches the payload of the ATM cell at a plurality of locations downstream from the upstream location within the ATM telecommunication device.

16. The method of claim 15 wherein the ATM telecommunication device comprises a plurality of replaceable modules and wherein the method comprises checking to determine whether the first payload integrity verification code matches the payload of the ATM cell at an ingress and egress of each of a plurality of the replaceable modules.

17. An ATM telecommunication device for use in an ATM packet switching network, the ATM telecommunications device comprising:

(a) an ingress, an egress, and a data path extending between the ingress and the egress;

(b) a payload integrity verification code calculator at a first location on the data path for generating a first payload integrity verification code from a payload of an ATM cell;

(c) a payload integrity verification code writing circuit connected to write the first payload integrity verification code to the ATM cell at the first location; and, (d) a payload integrity verification circuit at a second location on the data path downstream from the first location.

18. The ATM telecommunication device of claim 17 wherein the payload integrity verification circuit comprises:

(a) a second payload integrity verification code generator located on the data path downstream from the first location for generating a second payload integrity verification code from the payload of the ATM cell;

(b) a comparing circuit connected to compare the first payload integrity verification code to the second payload integrity verification code; and, (c) a signalling circuit for generating an error signal whenever the first payload integrity verification code is different from the second payload integrity verification code.

19. The ATM telecommunication device of claim 17 wherein the payload integrity verification circuit comprises: a calculator adapted to compute a result from the first payload integrity verification code and the payload of the ATM cell, the result having a first value if the first payload integrity verification code matches the payload and the result having a value other than the first value if the first payload integrity verification code does not match the payload.

20. The ATM telecommunication device of claim 17 wherein the ATM telecommunication device comprises an ATM switch and the data path extends through a switching matrix.

21. A signal propagating in an ATM switch, the signal comprising an ATM cell payload, an ATM cell header and a payload integrity verification code generated from the ATM cell payload, the payload integrity verification code stored in VCI and/or VPI fields of the ATM header.

22. A method for passing information from an upstream location in a cell stream in an ATM telecommunication device to a downstream location in the ATM telecommunication device, the method comprising:

a) receiving at an ATM telecommunication device an ATM cell having VPI and VCI fields in an ATM cell header;

b) at an upstream location within the ATM telecommunication device, adding a connection identifier to the ATM cell and recording information in at least a portion of the VPI and VCI fields of the ATM cell;

c) passing the cell to a downstream location along a data path in the ATM telecommunication device;

d) at the downstream location retrieving the recorded information; and, e) before the cell egresses from the ATM telecommunication device, if the information is recorded in any portion of the VPI field, writing a VPI value to the VPI field of the cell and, if the information is recorded in any portion of the VCI field, writing a VCI value to the VCI field of the cell and removing the connection identifier.

23. The method of claim 22 comprising adding to the ATM cell at the upstream location a flag indicating that the VPI and VCI fields of the ATM cell contain information other than VPI and VCI values.

24. The method of claim 23 wherein the information comprises a payload integrity verification code generated from a payload of the ATM cell.

* * * * *